(12) United States Patent
Ferren et al.

(10) Patent No.: US 8,776,177 B2
(45) Date of Patent: Jul. 8, 2014

(54) DYNAMIC CONTENT PREFERENCE AND BEHAVIOR SHARING BETWEEN COMPUTING DEVICES

(75) Inventors: Bran Ferren, Beverly Hills, CA (US); Lakshman Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1025 days.

(21) Appl. No.: 12/646,818

(22) Filed: Dec. 23, 2009

(65) Prior Publication Data

US 2010/0319052 A1 Dec. 16, 2010

Related U.S. Application Data

(60) Provisional application No. 61/187,520, filed on Jun. 16, 2009.

(51) Int. Cl.
*H04L 29/00* (2006.01)
*G06F 15/16* (2006.01)
*G06F 21/00* (2013.01)

(52) U.S. Cl.
CPC ............... *G06F 15/16* (2013.01); *G06F 21/00* (2013.01)
USPC .......... 726/3; 726/1; 726/22; 726/26; 726/29; 726/30

(58) Field of Classification Search
CPC .................................. G06F 15/16; G06F 21/00
USPC ....................................... 726/1, 22, 26, 29, 30
See application file for complete search history.

(56) References Cited

U.S. PATENT DOCUMENTS

| | | | |
|---|---|---|---|
| 6,240,521 B1 | 5/2001 | Barber et al. | 713/323 |
| 6,272,545 B1 | 8/2001 | Flanagin et al. | |
| 6,282,508 B1 | 8/2001 | Kimura et al. | |
| 6,317,831 B1 | 11/2001 | King | |
| 6,530,083 B1 * | 3/2003 | Liebenow | 725/46 |
| 6,603,469 B1 | 8/2003 | Gettemy et al. | 345/211 |
| 6,633,274 B1 | 10/2003 | Yokota et al. | |
| 6,753,842 B1 | 6/2004 | William et al. | 345/102 |
| 6,795,062 B1 | 9/2004 | Boursier | 345/204 |

(Continued)

FOREIGN PATENT DOCUMENTS

| CN | 1662870 | | 8/2005 |
|---|---|---|---|
| CN | 1961588 A | | 5/2007 |

(Continued)

OTHER PUBLICATIONS

Non-final Office Action for United Kingdom Patent Application No. GB1009708.7 mailed Aug. 25, 2010.

(Continued)

*Primary Examiner* — Brandon Hoffman
*Assistant Examiner* — Michael D Andrerson
(74) *Attorney, Agent, or Firm* — Blakely, Sokoloff, Taylor & Zafman LLP

(57) ABSTRACT

A remote user persona is received at a computing device. The computing device includes a local user persona having a plurality of subsets relating to preferences of a user of the computing device. The remote user persona is synchronized with the local user persona at the computing device and, accordingly, the behavior of the computing device is adjusted.

20 Claims, 6 Drawing Sheets

(56) References Cited

U.S. PATENT DOCUMENTS

| | | | |
|---|---|---|---|
| 6,874,089 B2 | 3/2005 | Dick et al. | |
| 6,910,139 B2 | 6/2005 | Ishidera | 713/320 |
| 6,973,333 B1 | 12/2005 | O'Neil | |
| 7,123,247 B2 | 10/2006 | Morita | |
| 7,190,338 B2 | 3/2007 | Kubota et al. | |
| 7,239,742 B2 | 7/2007 | Ohtani et al. | |
| 7,424,674 B1 | 9/2008 | Gross et al. | |
| 7,463,255 B2 | 12/2008 | Yang | 345/211 |
| 7,581,180 B2 | 8/2009 | Masui et al. | |
| 7,782,333 B2 | 8/2010 | Yamaguchi et al. | |
| 8,254,957 B2 | 8/2012 | Ferren et al. | 455/456.1 |
| 2002/0028684 A1* | 3/2002 | Kuwahra et al. | 455/456 |
| 2002/0040442 A1 | 4/2002 | Ishidera | |
| 2002/0119788 A1 | 8/2002 | Parupudi et al. | |
| 2002/0138286 A1* | 9/2002 | Engstrom | 705/1 |
| 2002/0173295 A1 | 11/2002 | Nykanen et al. | |
| 2002/0180723 A1 | 12/2002 | Siwinski | |
| 2003/0126330 A1 | 7/2003 | Balasuriya | |
| 2003/0134640 A1 | 7/2003 | Kim et al. | |
| 2003/0200481 A1 | 10/2003 | Stanley | |
| 2004/0203768 A1 | 10/2004 | Ylitalo et al. | |
| 2004/0230593 A1* | 11/2004 | Rudin et al. | 707/100 |
| 2004/0257316 A1 | 12/2004 | Nguyen | 345/87 |
| 2005/0044423 A1 | 2/2005 | Mellmer et al. | |
| 2005/0110717 A1 | 5/2005 | Iwamura | 345/76 |
| 2005/0124389 A1 | 6/2005 | Yang | |
| 2005/0283724 A1 | 12/2005 | Griffin | |
| 2006/0036895 A1* | 2/2006 | Henrickson | 714/4 |
| 2006/0101293 A1 | 5/2006 | Chandley et al. | |
| 2006/0123081 A1 | 6/2006 | Baudino et al. | |
| 2006/0132474 A1 | 6/2006 | Lam | |
| 2006/0206733 A1 | 9/2006 | Ono | |
| 2006/0236144 A1 | 10/2006 | Chao | |
| 2006/0267972 A1 | 11/2006 | Yi | 345/211 |
| 2007/0004393 A1 | 1/2007 | Forsberg et al. | |
| 2007/0021108 A1 | 1/2007 | Bocking et al. | |
| 2007/0073725 A1 | 3/2007 | Klein, Jr. et al. | |
| 2007/0082712 A1 | 4/2007 | Ikeda et al. | |
| 2007/0226649 A1 | 9/2007 | Agmon | |
| 2008/0055318 A1 | 3/2008 | Glen | 345/501 |
| 2008/0220715 A1 | 9/2008 | Sinha et al. | |
| 2008/0243808 A1 | 10/2008 | Rieman et al. | |
| 2008/0253345 A1 | 10/2008 | Sanguinetti | |
| 2008/0261593 A1 | 10/2008 | Wong et al. | |
| 2008/0288955 A1 | 11/2008 | Brockway et al. | |
| 2009/0019131 A1 | 1/2009 | Ganesan | |
| 2009/0070030 A1 | 3/2009 | Isoda et al. | |
| 2009/0070606 A1 | 3/2009 | Chen et al. | |
| 2009/0088089 A1 | 4/2009 | Chandra et al. | |
| 2009/0106266 A1* | 4/2009 | Donatelli et al. | 707/10 |
| 2009/0138276 A1 | 5/2009 | Hayashida et al. | |
| 2009/0163226 A1 | 6/2009 | Karkaria et al. | |
| 2009/0165145 A1 | 6/2009 | Haapsaari et al. | |
| 2009/0176505 A1 | 7/2009 | Van Deventer et al. | |
| 2009/0213762 A1 | 8/2009 | Guo et al. | |
| 2009/0286557 A1 | 11/2009 | Clipsham | |
| 2009/0322800 A1 | 12/2009 | Atkins | 345/690 |
| 2010/0062788 A1 | 3/2010 | Nagorniak | |
| 2010/0063867 A1 | 3/2010 | Proctor et al. | |
| 2010/0120450 A1 | 5/2010 | Herz | |
| 2010/0277512 A1 | 11/2010 | Shen et al. | 345/690 |
| 2010/0298048 A1 | 11/2010 | Yamazaki | |
| 2010/0317336 A1 | 12/2010 | Ferren et al. | |
| 2010/0318903 A1 | 12/2010 | Ferren | |
| 2011/0010458 A1 | 1/2011 | Das et al. | |
| 2011/0074765 A1 | 3/2011 | Oterhals et al. | 345/418 |
| 2011/0080419 A1 | 4/2011 | Croxford et al. | 345/531 |
| 2011/0116491 A1 | 5/2011 | Kovacs et al. | |
| 2012/0302323 A1 | 11/2012 | Gagner et al. | |

FOREIGN PATENT DOCUMENTS

| | | |
|---|---|---|
| CN | 101048810 | 10/2007 |
| CN | 101291341 A | 10/2008 |
| CN | 101303747 | 11/2008 |
| CN | 101303747 A | 11/2008 |
| CN | 101447987 A | 6/2009 |
| CN | 101464722 A | 6/2009 |
| EP | 1217792 | 6/2002 |
| EP | 1204262 | 3/2004 |
| EP | 1445923 | 8/2004 |
| EP | 1737193 | 12/2006 |
| EP | 1903759 | 3/2008 |
| EP | 2076001 | 7/2009 |
| GB | 2373914 | 10/2002 |
| GB | 2397196 | 7/2004 |
| GB | 2421147 | 6/2006 |
| JP | 09-138716 | 5/1997 |
| JP | 2000-250455 | 9/2000 |
| JP | 2003-284138 | 10/2003 |
| JP | 2004503875 A | 2/2004 |
| JP | 2004-260796 | 9/2004 |
| JP | 2005526312 A | 9/2005 |
| JP | 2006-236159 | 9/2006 |
| JP | 2007-135006 | 5/2007 |
| JP | 2007135006 | 5/2007 |
| JP | 2007-219835 | 8/2007 |
| JP | 2007-282017 | 10/2007 |
| JP | 2008-193546 | 8/2008 |
| JP | 2009-49564 | 3/2009 |
| JP | 2009-116459 | 5/2009 |
| JP | 2010011334 | 1/2010 |
| JP | 2010107784 | 5/2010 |
| KR | 1020090038361 | 4/2009 |
| TW | 200638188 | 11/2006 |
| WO | WO01/97074 | 12/2001 |
| WO | WO03/009511 | 1/2003 |
| WO | WO03/088127 | 10/2003 |
| WO | WO-2005/101239 | 10/2005 |
| WO | WO2006/042265 A2 | 4/2006 |
| WO | WO-2006/045424 | 5/2006 |
| WO | WO-2007038281 | 4/2007 |
| WO | WO2007038281 | 4/2007 |
| WO | WO-2008067261 | 6/2008 |
| WO | WO-2008/091479 | 7/2008 |
| WO | WO2010/133770 | 11/2010 |
| WO | WO2010147610 | 12/2010 |

OTHER PUBLICATIONS

Non-final Office Action for United Kingdom Patent Application No. GB1009714.5 mailed Aug. 18, 2010.
Combined Search Report and Examination Report for United Kingdom Patent Application 1009711.1 issued Sep. 23, 2010 Mailed Oct. 22, 2010., 17 pages.
Application No. 1009711.1 issued Sep. 23, 2010 Mailed Oct. 22, 2010., 17 pages.
First Office Action for German Patent Application No. 10 2010 023 692.6-31 mailed Mar. 18, 2011.
Notice of Preliminary Rejection for Korean Patent Application No. 10-2010-57105, Mailed Jun. 23, 2011, 5 pages.
Non-Final Office Action for U.S. Appl. No. 12/646,658, Mailed Aug. 23, 2011, 16 pages.
Non-Final Office Action for U.S. Appl. No. 11/020,397, Mailed Sep. 11, 2007, 12 pages.
Final Office Action for U.S. Appl. No. 11/020,397, Mailed Jun. 30, 2008, 13 pages.
Non-final Office Action for United Kingdom Patent Application No. GB1009714.5 mailed Oct. 18, 2011.
First Office Action for German Patent Application No. 10 2010 023 691.8-31 mailed Dec. 2, 2011.
Notice of Preliminary Rejection mailed Jul. 31, 2012(+English Translation), in Korean Patent Application No. 10-2010-57267, 6 pages.
First Official Action mailed Apr. 10, 2012(+English translation), in Japanese Patent Application No. 2010-135660, 6 pages.
Office Action mailed May 22, 2012(+English translation), in Japanese Patent Application No. 2010-135662, 6 pages.
Combined search and examination report mailed May 2, 2012, un Great Britain Patent Application No. GB1009714.5, 3 pages.

(56) References Cited

OTHER PUBLICATIONS

International Search Report and Written Opinion received for international Application No. PCT/US2009/069927, mailed Jul. 29, 2010, 7 pages.
Office Action mailed Apr. 24, 2012, in U.S. Appl. No. 13/376,618, 11 pages.
Office Action mailed May 8, 2012 (+English translation), in Japanese Patent Application No. 2010-135661, 9 pages.
Examination Report dated Jun. 14, 2012, in Great Britain Patent Application No. GB 1009711.1, 4 pages.
Examination Report mailed Jan. 12, 2012, Great Britain Patent Application No. GB1009711.1, 6 pages.
Notice of Preliminary Rejections mailed Jul. 31, 2012 (+English translation), in Korean Patent Application No. 10-2010-57267, 6 pages.
Non-Final Office Action for U.S. Appl. No. 12/646,837, Mailed Jun. 6, 2011, 12 pages.
Office Action from UK1009708.7 mailed Jan. 9, 2012, 2 pages.
Office Action mailed Jun. 6, 2012, in U.S. Appl. No. 12/646,730, 20 pages.
"Office Action dated Nov. 5, 2012 (+English Translation), in Chinese Patent Application No. 201010206761.4, 14 pages".
Non-Final Office Action for Chinese. Patent Application No. 201010208688.4, Mailed Oct. 9, 2012, 8 pages.
Notice of Preliminary Rejections mailed Dec. 18, 2012, in Japanese Patent Application No. 2010-135661, 3 pages.
Decision on Rejection dated Sep. 3, 2013 (+English translation), in Chinese Patent Application No. 201010206761.4, 11 pages.
Examination Report dated Aug. 1, 2013, in Great Britain Patent Application No. 1009711.1, 5 pages.
Final Rejection Decision dated Aug. 29, 2013 (+English translation), in Japanese Patent Application No. 2010-135660, 4 pages.
Notice of Preliminary Rejection dated Jul. 31, 2012 (+English translation), in Korean Patent Application No. 10-2010-57267, 6 pages.
Notice of Third Office Action dated Nov. 28, 2013 (+English translation), in Chinese Patent Application No. 201010208646.0, 7 pages.
Office Action dated Jan. 10, 2013 (+English translation), in Chinese Patent Application No. 201010208646.0, 23 pages.
Office Action dated Jan. 29, 2013 (+English translation), in Japanese Patent Application No. 2010-135660, 2 pages.
Office Action dated Jun. 20, 2013 (+English translation), in Chinese Patent Application No. 201010208646.0, 7 pages.
Second Office Action dated Jun. 24, 2013 (+English translation). in Chinese Patent Application No. 201010208688.4, 9 pages.
Office Action dated Nov. 5, 2012 (+English translation), in Chinese Patent Application No. 201010206761.4, 22 pages.
Office Action dated Oct. 9, 2012 (+English translation), in Chinese Patent Application No. 201010208688.4, 14 pages.
Office Action mailed Apr. 25, 2013, in U.S. Appl. No. 13/770,977, 10 pages.
Office Action mailed Mar. 26, 2013 (+English translation), in Japanese Patent Application No. 2010-135662, 7 pages.
Official Action dated Aug. 12, 2013 (+English translation), in German Patent Application No. 102010019637.1, 13 pages.
Second Office Action dated Apr. 24, 2013 (+English translation), in Chinese Patent Application No. 201010206761.4, 20 pages.
Translation of Decision of Refusal dated Dec. 18, 2012, in Japanese Patent Application No. 2010-135661, 3 pages.
Third Office Action dated Dec. 24, 2013, in Chinese Patent Application No. 201010208688.4 3 pages.
Second Office Action dated Jun. 24, 2013, in Chinese Patent Application No. 201010208688.4 3 pages.

\* cited by examiner

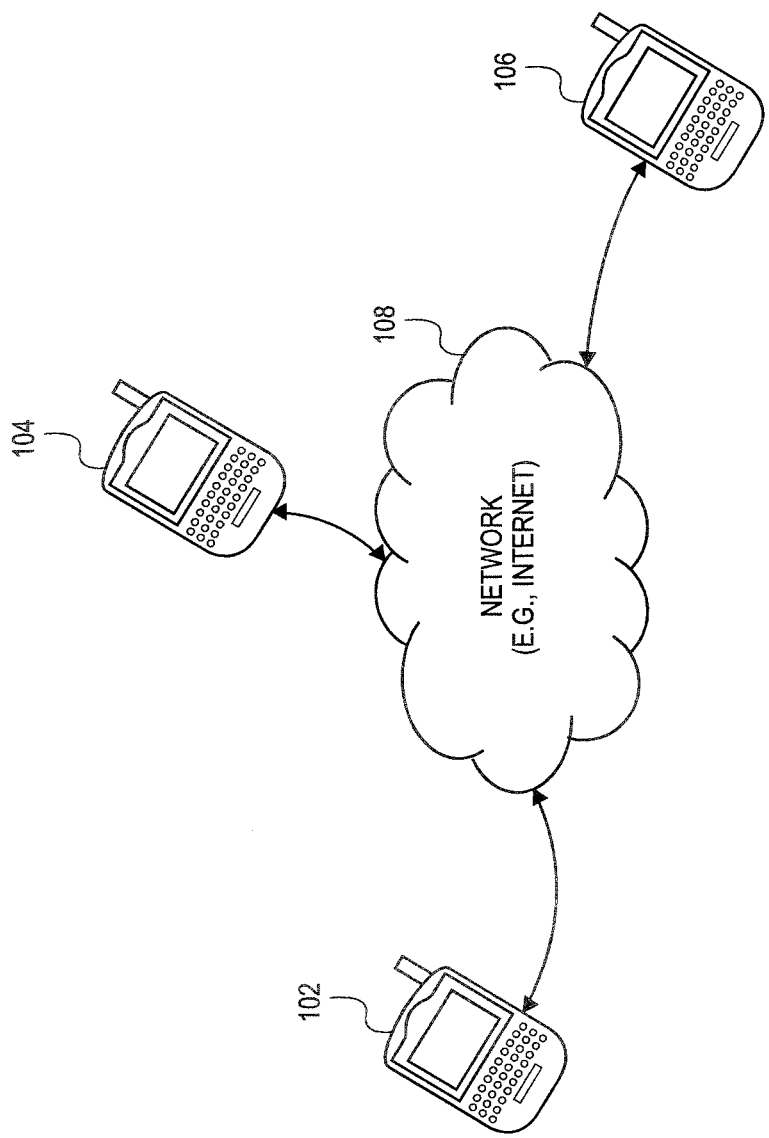

DYNAMIC CONTENT PREFERENCE AND BEHAVIOR SHARING BETWEEN COMPUTING DEVICES

RELATED APPLICATION

The present patent application claims priority of Provisional Patent Application Ser. No. 61/187,520, filed Jun. 16, 2009, entitled Multi-Mode Handheld Electronic Device.

FIELD

The field relates generally to the computing sciences and, more particularly, to dynamic content and preference sharing between computing devices.

BACKGROUND

With the increasing use of smaller mobile computing devices, there is an increasing demand for sharing of information between such devices. Many modern mobile computing devices or personal digital assistants (PDAs) provide content sharing techniques (e.g., via Bluetooth) such that information (e.g., photos, files, schedules) can be shared between devices and therefore, between the users of the devices. However, these content sharing techniques are strictly limited to merely sharing of the content and lack the necessary intelligence to, for example, integrate user preferences that can change the device behavior.

BRIEF DESCRIPTION OF THE DRAWINGS

Embodiments of the present invention are illustrated by way of example and not by way of limitation in the figures of the accompanying drawings, in which like references indicate similar elements and in which:

FIGS. 1A and 1B illustrate an embodiment of two or more computing devices sharing whole or partial user persona (e.g., user preferences or content) over a network;

DETAILED DESCRIPTION

Figure 1B:
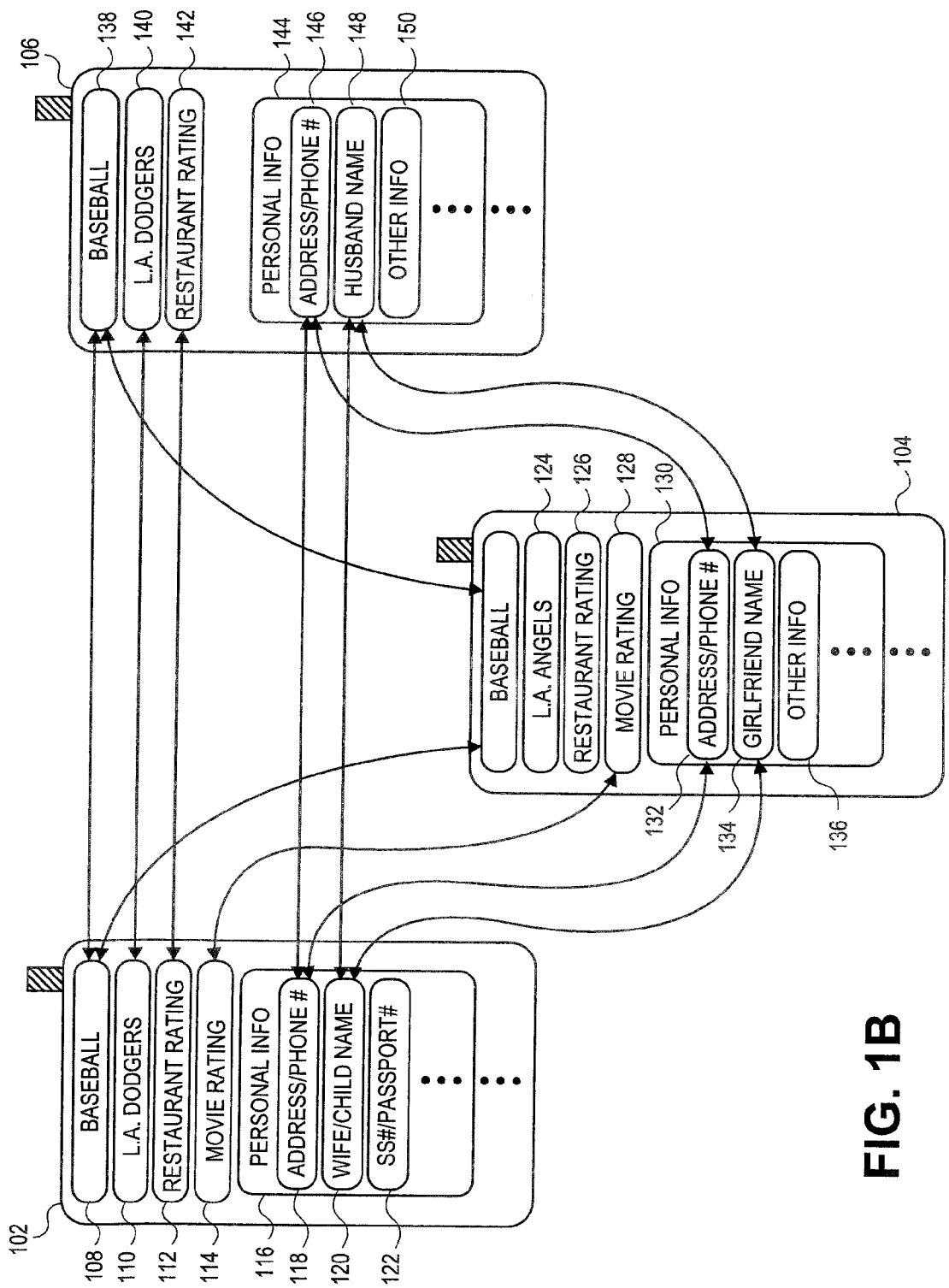

In one embodiment, sharing of content and integrating of user preferences between two or more computing devices (as initiated and authorized by the respective device users) is provided. This behavior-influencing content that represents user preferences is referred to as "persona" throughout this document. This integration synchronization or merging of preferences can ease, for example, the planning of events and the selection of activities appropriate to two or more users (e.g., choice of restaurants). In one combination scheme, two or more devices intersect content, such as a list of activities or venue that each user has explicitly tagged as "of interest" to find activities or venues suitable for two or more users associated with the two or more devices. Alternatively, the computing devices can subtract a list of activities or venues for a user that has listed the activities and/or venues as "not of interest" from the "of interest" list of the other user. The two or more computing devices may combine these two schemes by performing the subtraction on a pair-wise basis prior to the intersection operation.

In yet another embodiment, two or more broader senses-of-preferences are mathematically combined to yield a set of preferences reflecting the combined user tastes. For example, the system may multiply (on an element-by-element basis) vectors representing the desirability of activities or venues (e.g., restaurants, ballparks, concert halls, etc.) in each user's eyes along with each of several dimensions (e.g., price, type of cuisine). The resulting vector of combined weightings may be applied (via dot multiplication) to the space of available activities or venues to reveal options preferred by the two or more users of the two or more computing devices collectively. It is contemplated that any number of devices may be involved in these sharing of content and preferences and that other forms of content (such as contact lists) may be used to aid in coordinating group activities.

In one embodiment, although the personas are synchronized or merged when shared between two or more devices based on the behavior of the computing device and the content of the persona being imported and the existing persona of the receiving device, the persona are nevertheless adjusted to each individual user as provided through the existing person of the receiving computing device. The behavior of the computing device may be static or dynamic in that it can change with the life or user mode on which the computing device is set. For example, when in the work mode, certain informal persona content (e.g., language slang being shared between friends) is not triggered until the computing device is set to a more informal life mode, such as the play mode.

In one embodiment, a persona may be generated, divided and recognized in subsets or parts such that a persona may be shared as a whole or in parts or subsets. This novel technique is used so that not only the user has control over what information to share with other users using their computing devices, but also so that certain subsets that contain personal or identifiable information relating to the user may be locked or prohibited from being shared with those who are not authorized to receive such information. For example, if a user (e.g., a husband) wishes to communicate his personal information with another user (e.g., his wife), the wife's computing device can be authorized to receive those particular subsets that include the husband's personal information, but other users cannot. Using this technique, in one embodiment, a user can anonymously share his persona or parts of his persona with other users via the corresponding computing devices without the fear or potential of sharing any personal or identifiable information. This is achieved by, first, using an authoring tool that allows the user to write the persona in subsets and, second, using a persona division and recognition logic that can recognize various subsets of the persona and have the ability to package them together, as appropriate, before sending them to the receiving computing device.

FIGS. 1A and 1B illustrate an embodiment of two or more computing devices 102-106 sharing whole or partial user persona (e.g., user preferences or content) over a network 108. In one embodiment, two or more mobile devices 102-106 securely communicate and share user persona (e.g., certain parts of the persona as preferred by the respective users) over a network (e.g., Internet) 108. A user persona represents the collection of the corresponding device's active look and feel, static behavior, and dynamic context/surrounding aware behavior.

A user persona, for example and in one embodiment, includes a user's personal and non-personal information/content/preferences that relate to the user's multiple aspects of life, such as various changing life modes of the user that the user's computing device can be set to for behavior changes. These multiple life modes may include a family mode, a play mode, a work mode, and the like. Since the user is expected (and in some cases, required) to behave differently in each mode, he or she can save a different set of information for each life mode, while some of the information can be overlapping in multiple life modes and further classified in terms of its sensitivity, confidentiality, and how personal the information is regarded, etc.

For example, user information may include the user's name, date of birth, social security number, family names, family photos, favorite sports team, favorite restaurants, etc. In this case, for example, the user might be willing to share his name and favorite team with other users, but not his family names or social security number. Continuing with the example, some of the user information like the user's social security number and favorite restaurants, etc., can found in both the user's family mode and work mode.

In one embodiment, user persona as referred to in this document is more than merely a collection of user information and preferences. For example, a persona represents both the static behavior and the dynamic behavior of the computing device where the person resides, such as when a change is made to the persona, the computing device changes its behavior reflecting the behavior of the user of the computing device. More specifically, for example, the computing device and the user persona are aware of the physical surroundings of the computing device and thus, for example, if the user's persona includes a list of user's favorite restaurants located on the home-office route, a 'home-office route favorite restaurants' feature is triggered when the computing device is on or at least in proximity of the home-office route.

Similarly, in one embodiment, if the user moves offices or homes, this particular feature is removed from the user persona or becomes automatically disabled. Along with being aware of the physical surroundings, the computing device and the user persona are also aware of the current life mode of the computing device. For example, as further shown in FIG. 1B, if certain persona subsets relating to sports are shared between computing devices, these persona subsets may not be triggered with the computing devices in the work mode. However, when the user is in the play mode, these sports-related persona subsets may be triggered and further, the computing device may offer a notification (e.g., alarm, color coding, etc.) to the user if there is a score update or news relating to the user's favorite sports team. In one embodiment, a life mode of the computing device based on manual user settings (e.g., a user assigns work mode from 8 am-5 pm on weekdays and family mode on Sundays, etc.) or automatic physical surroundings (e.g., the computing device assumes work mode when it is within a reasonable proximity of the user's office building and, similarly, assumes family mode when it is within a reasonable proximity of the user's house).

FIG. 1B illustrates user personas and their subsets being shared between two or more computing devices 104-106. As illustrated, the persona of computing device 102 includes baseball 108 (the user's favorite sport), LA Dodgers 110 (favorite baseball team), the user's restaurant rating 112 and movie rating 114 of any number of restaurants and movies, respectively, and more personal information 116, such as the user's address and phone number 118, his wife and children's names 120, social security and passport numbers 122. Similarly, computing devices 104 and 106 contain personas belonging to other users. In this exemplary case, the users of devices 102-106 are friends and wish to share some of the persona with each other. For example, all three users are interested in the sport of baseball and therefore, information (e.g., scores, news, baseball applications, etc.) relating to baseball 108, 124, 138 is shared by the three computing devices 102-106. However, only the users of computing devices 102, 106 regard LA Dodgers 110, 140 as their favorite team, while the user of computing device 104 regards LA Angels 124 as his favorite team and thus, computing devices 102, 106 share any information relating to the LA Dodgers 110, 140 of the corresponding user personas, but computing device 104 does not share such information having its own persona subset of LA Angles 124.

Similarly, computing devices 102, 106 share restaurant ratings 112, 142, while computing devices 102, 104 share movie ratings 114, 128. Of the personal information 116, 130, 144 of the three persons, the subsets of home address and phone number 118, 132, 146 and family names 120, 134, 148 are shared, while other more sensitive personal information, such as passport number and social security number 122, 136, 150, are not shared between the computing devices 102-106.

Figure 2:
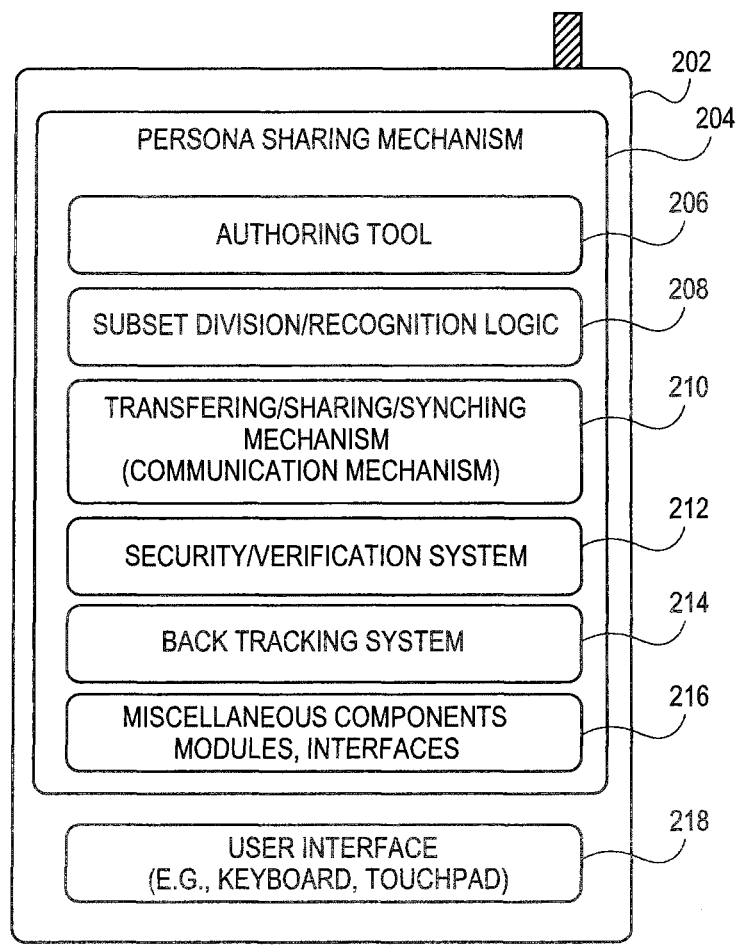
FIG. 2 illustrates an embodiment of a computing device having a persona sharing mechanism.

FIG. 2 illustrates an embodiment of a computing device 202 having a persona sharing mechanism 204. In one embodiment, a tri-life persona is created by a user on a computing device 202 and a method, system and apparatus are provided to share and synchronize or merge these personas between a number of computing devices in a safe and secure manner. A tri-life persona represents a collection of the computing device's 202 active look and feel, static behavior, and dynamic context and surrounding aware behavior. A specific persona may be represented as a static set of descriptors (e.g., represented in eXtensible Markup Language (XML)), or a set of active executable scripts or objects which control the elements of the persona.

Furthermore, elements of a single persona are divided into subsets that represent a number of elements that can be shared and traded between two or more computing devices. These subsets are created to allow a user to separate those private persona elements that are not to be shared from those elements that are to be shared. Additionally, a persona also allows for a representation of behaviors while maintaining private data, such as a persona forwards a phone call to a personal phone number. This way, when that persona is transferred between various computing devices, the behavior of each of the computing devices is transformed, while retaining the privacy and security of the actual data of the computing devices.

In one embodiment, the persona sharing mechanism 204 includes an authoring logic or tool 206 to create and modify an individual or group persona belonging to a user or users associated with the computing device 202. Certain content of a persona for each life mode may be pre-authored and pre-loaded on the computing device 202; however, a new persona may be created or an existing persona may be modified on the computing device 202 using the authoring tool 206. Unlike a typical editing tool that is dependent on a specific setting and the device's fixed behavior, the authoring tool 206, in one embodiment, is novel in that it is a dynamic tool that allows the user to specify and the computing device 202 to recognize causal relationships between behaviors and events and surroundings relating to the computing device 202 and act accordingly. For example, during staff meetings in the work mode, the computing device 202 vibrates when the user's husband or children call or send a message to it, while the computing device 202 stays silent when others (including friends, strangers, etc.) reach it. Such constructs and complex behaviors may be modeled using a descriptive set of language elements or graphical objects (e.g., petri-nets or other decision graph representation) that allow the behaviors of the computing device 202 to be verified and modeled to be corrected. It is contemplated that other plug and play mathematical models may also be employed on the computing device 202 to validate its changing behaviors.

An individual or group persona may be divided into a number of subsets, such that one or more subsets of a persona can be communicated (e.g., transmitted/received/shared) between two or more computing devices without having to communicate the entire persona; this way, only the relevant content is shared. The authoring tool 206 allows the extraction of a sub-graph of static dynamic, and context and surrounding aware behaviors, while a subset division and recognition logic 208 packages these subsets for export. These sub-graphs and their data can be packaged using specific elements or named elements via the subset division and recognition logic 208. Further, for each context, an identifier may be used and kept anonymous to provide and preserve a specific meaning in each context. For instance, an identifier "home number" may be unique for every person transferrable and yet, it may not represent the same information. Each shared persona may be verified for functionality by performing checks on them by comparing resultant export data to information that is personally identifiable (such as user name, home address, and other personal identifiers, etc.). The authoring tool 204 allows for the authoring of individual or group personas through a single setting being done by the user of the computing device 202 and/or being done piece-by-piece by observing the day-to-day usage of the computing device 202.

The persona sharing mechanism 204 further includes a persona transferring/sharing/synching mechanism (communication mechanism) 210 to provide secure forms of sharing of the whole or parts of personas between two or more computing devices through, but not limited to, a direct device-to-device transfer (e.g., Bluetooth), an email, a website, a network repository, an online social network (e.g., Facebook, Twitter, LinkedIn), a software application update or download, etc. Using this communication mechanism 210, personas are communicated and shared between and synched at two or more participating computing devices (such as the computing device 202). A security and verification system 212 is also provided so that each time a user decides to import a new persona at his computing device (e.g., computing device 202) from another computing device, both the persona being important and the computing device from where it is being imported are verified to be safe and secure. For example, a new persona being imported can be verified to be correct using the security and verification system 212 and its pilot/emulator to sandbox the persona (being imported) that is then subjected to a simulated behavior. It is contemplated that the level of security and verification can be dynamically set or reset by the user on the receiving computing device 202 based on the trustworthiness of the transmitting source (the transmitting user and the transmitting computing device) as well as the content of the persona that is being imported.

The persona sharing mechanism 204 also includes a back tracking system 214 that allows the shared personas, including each element of one or more subsets of the personas, to be back tracked at any time after a persona has been shared by two or more computing devices. In one embodiment, the back tracking system 214 includes a backup component to perform periodic backups of personas including the shared personas and any changes or modifications that are made to such personas. The timespan of these periodic backups may be event-based (e.g., upon occurrence of identified events) or according to pre-determined time periods or changing time periods that are dynamically set on the computing device 202 by the user. This novel back tracking system 214 allows for time-based or event-based backups of personas and snapshots of the particulars of the interdependency of behaviors of those computing devices that share a whole or one or more parts of one or more personas. If a set of shared persona elements represents a standalone leaf in an interdependency tree, the set could be rather easily removed from one or more computing devices. However, if a set of shared persona elements have multiple dependencies (e.g., one element cannot be removed without removing another related element), then any static shared persona elements that represent the look and feel are maintained even if the relevant behavior elements may be have been removed. As for the dynamic shared persona elements, the back tracking system 214 may extract the input to a sub-graph and create an automatic extension to output these elements and provide the user an option to bridge any active elements with a new decision/behavior graph.

As illustrated, the computing device 202 further includes other miscellaneous hardware and/or software components, modules, and interfaces 216 to perform particular tasks to work with other aforementioned systems 206-214 of the persona sharing mechanism 204. The computing device 202 further includes a user interface 218 (e.g., keyboard, touchpad) to be used by the user to share (by receiving or transmitting) a whole or one or more parts of a persona with another computing device.

Figure 3:
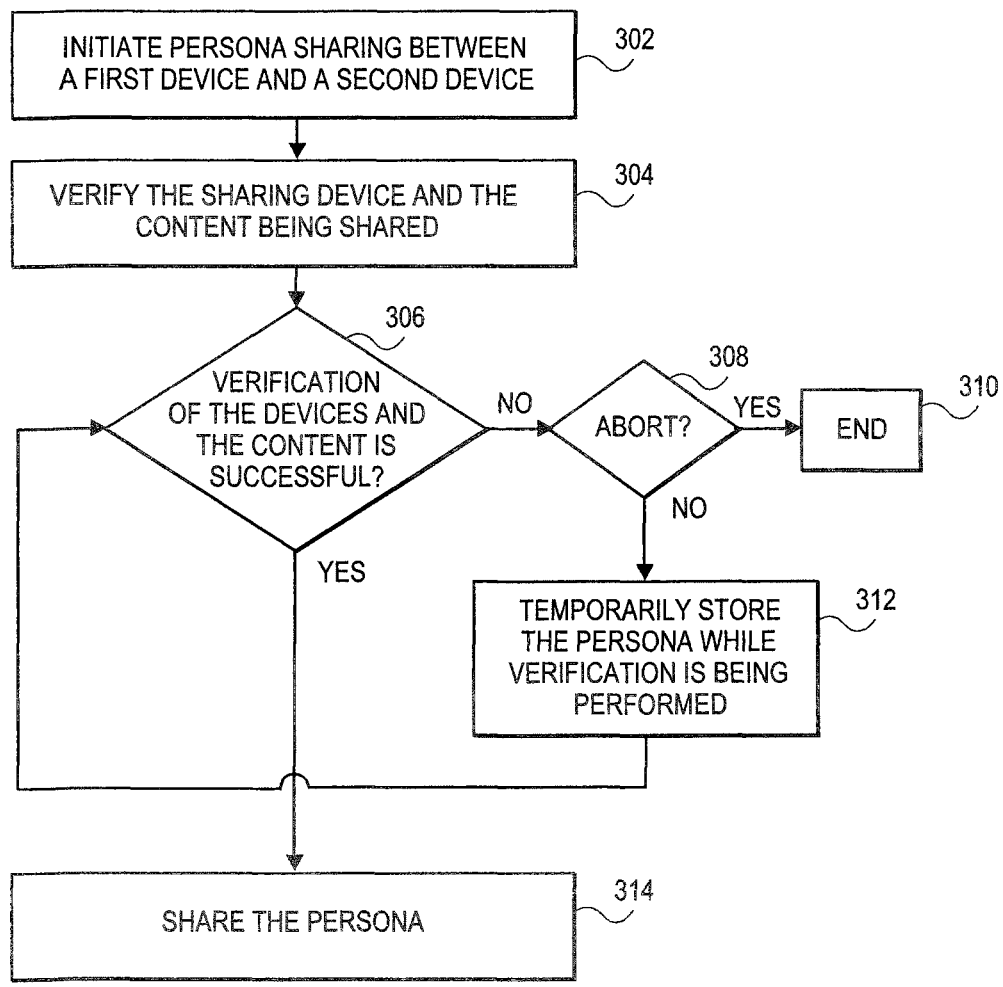
FIG. 3 illustrates an embodiment of a process for sharing personas between multiple computing devices.

FIG. 3 illustrates an embodiment of a process for sharing personas between multiple computing devices. At processing block 302, in one embodiment, persona (e.g., content or preference) sharing is initiated between a first computing device and a second computing device. As aforementioned, this sharing of the persona is not limited to two computing devices and can be shared between various computing devices. At processing block 304, both the sharing device and the persona being shared are verified and certified as safe prior to the sharing of the persona. For example, if the first computing device initiates to transmit a persona (e.g., a whole or one or more parts of the persona) to the second computing device, in response, the first computing device and the persona are verified and certified as being safe before the second computing device is allowed to receive the person from the first computing device.

At decision block 306, a determination is made as to whether the verification of the two computing devices and the persona is successfully done. If yes, the persona is shared between the first and second computing devices at processing block 314. If, for some reason, the verification process is not done successfully, such as it takes longer than expected, etc., a determination is made as to whether the sharing process of the person be aborted. If yes, the sharing process ends at termination block 310. The sharing process can be terminated for various reasons, such as the first (transmitting) computing device or the persona is not verified (e.g., a virus is detected on the first computing device or the persona, the transmitting computing device could not be verified due to lack of registration, the sharing process is terminated by a user of either computing device, etc.).

Referring back to decision block 308, if the sharing process is not to be terminated even if, for example, the verification process is taking longer than usual (for any variety of reasons), the persona may be received by the second computing device and is then stored in a temporary storage area on the second computing device or remotely at a server coupled with the first computing device and/or the second computing device over a network until the verification process is completed at processing block 312. Once the verification process is completed, the persona is shared between the first and second computing devices at processing block 314.

Figure 4:
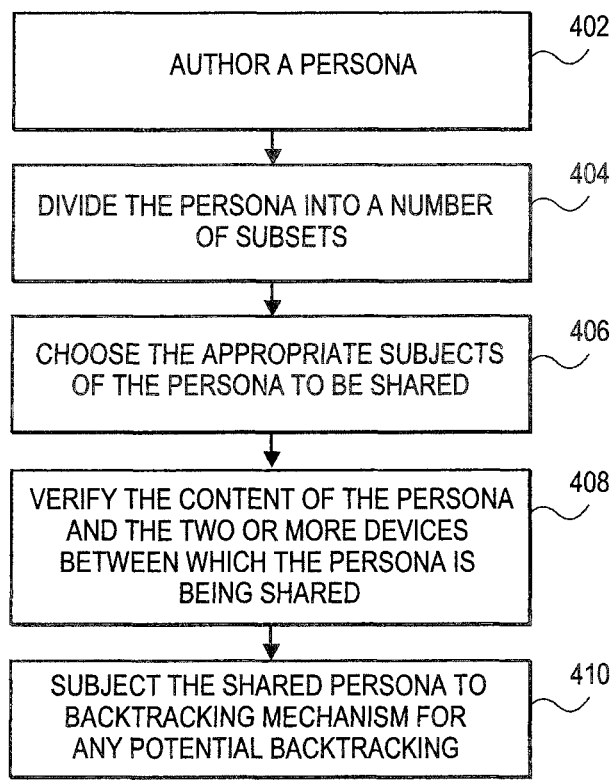
FIG. 4 illustrates an embodiment of a process for persona sharing between multiple computing devices.

FIG. 4 illustrates an embodiment of a process for persona sharing between multiple computing devices. In one embodiment, a user persona is authored by a user at a first computing device using an authoring tool of the first computing device at processing block 402. A part of the persona may be pre-authored and pre-loaded on the first computing device. Further, as aforementioned, in a computing device with multiple life modes (e.g., a tri-life mode mobile computing device having a work mode, a family mode, and a play mode), multiple personas may be authored by the user to satisfy each life mode available on the computing device. For example, having family photos in the family mode would be appropriate but not necessarily in the work mode. In addition to creating a new user persona, the authoring tool is also used to make amendments or modifications to the existing user persona. Moreover, in one embodiment, at processing block 404, a user persona may be authored in various parts or subsets to allow the user to share only one or more parts or subsets of the persona rather the being forced to share or not share the entire persona. A subset division/recognition logic is used to pack or packet the subsets of the persona as well as to facilitate the sharing (e.g., transmitting/receiving) of the whole persona or any number of the subsets of the persona.

At processing block 406, the user chooses one or more appropriate subsets of the persona to be shared with another computing device. At processing block 408, the persona being offered for sharing as well the computing device that offers it are both verified. Once the persona is shared between two or more computing device, at processing block 410, each computing device performs event-based and/or time-based backup of the persona and any modifications made to it, while maintaining the ability to back track the whole or any part of the shared persona for any reason.

Figure 5:
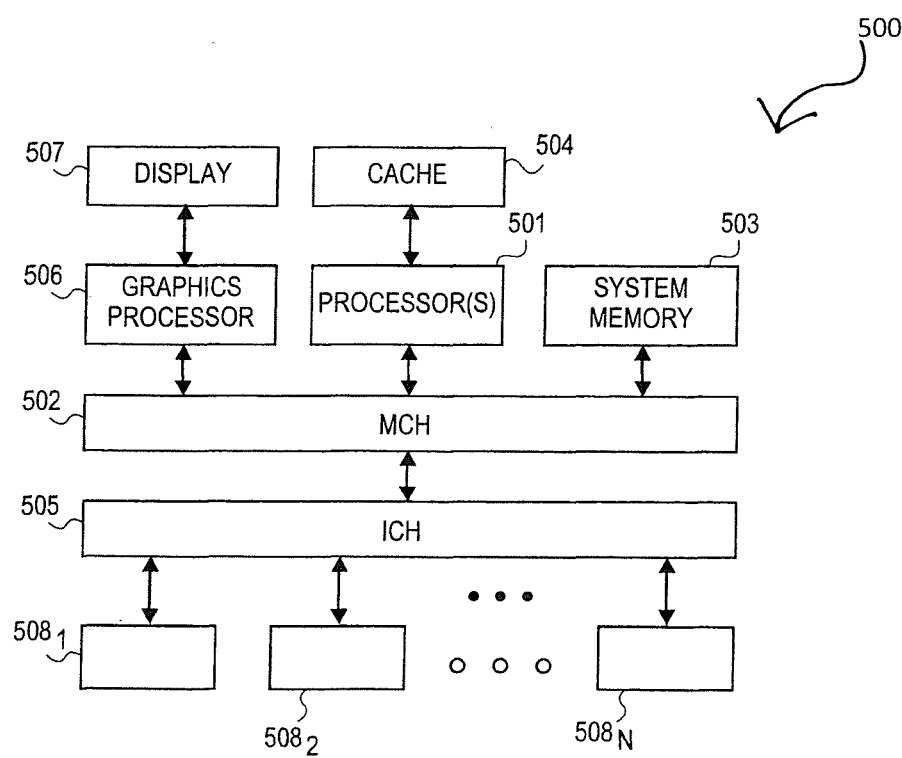
FIG. 5 illustrates an embodiment of a computing system.

FIG. 5 illustrates an embodiment of a computing system 500. The computing system 500 includes any type or size of computing system, such as a mobile computing system or a handheld data processing device, such as a PDA, smartphone, pocket computer, etc. The exemplary computing system of FIG. 5 includes: 1) one or more processors 501 at least one of which may include features described above (e.g., components and logic for customizable and predictive dictionary); 2) a memory control hub (MCH) 502; 3) a system memory 503 (of which different types exist such as double data rate RAM (DDR RAM), extended data output RAM (EDO RAM) etc.); 4) a cache 504; 5) an input/output (I/O) control hub (ICH) 505; 6) a graphics processor 506; 7) a display/screen 507 (of which different types exist such as Cathode Ray Tube (CRT), Thin Film Transistor (TFT), Liquid Crystal Display (LCD), DPL, etc.; and 8) one or more I/O devices 508 (e.g., keyboard, touchpad, mouse, Bluetooth components, etc.).

The one or more processors 501 execute instructions in order to perform whatever software routines the computing system implements, such as, in these embodiments, the functions and operations of persona (e.g., preferences and content) sharing between two or more computing devices as described throughout this document. The instructions frequently involve some sort of operation performed upon data. Both data and instructions are stored in system memory 503 and cache 504. Cache 504 is typically designed to have shorter latency times than system memory 503. For example, cache 504 might be integrated onto the same silicon chip(s) as the processor(s) and/or constructed with faster static RAM (SRAM) cells whilst system memory 503 might be constructed with slower dynamic RAM (DRAM) cells. By tending to store more frequently used instructions and data in the cache 504 as opposed to the system memory 503, the overall performance efficiency of the computing system improves.

System memory 503 is deliberately made available to other components within the computing system 500. For example, the data received from various interfaces to the computing system 500 (e.g., keyboard and mouse, printer port, Local Area Network (LAN) port, modem port, etc.) or retrieved from an internal storage element of the computer system (e.g., hard disk drive) are often temporarily queued into system memory 503 prior to their being operated upon by the one or more processor(s) 501 in the implementation of a software program. Similarly, data that a software program determines should be sent from the computing system to an outside entity through one of the computing system interfaces, or stored into an internal storage element, is often temporarily queued in system memory 503 prior to its being transmitted or stored. System memory 503 may also be used to store a user persona, according to one embodiment, and other relevant information as described elsewhere in this document.

The ICH 505 is responsible for ensuring that such data is properly passed between the system memory 503 and its appropriate corresponding computing system interface (and internal storage device if the computing system is so designed). The MCH 502 is responsible for managing the various contending requests for system memory 503 accesses amongst the processor(s) 501, interfaces and internal storage elements that may proximately arise in time with respect to one another.

One or more I/O devices 508 are also implemented in a typical computing system 500. I/O devices generally are responsible for transferring data to and/or from the computing system (e.g., a networking adapter); or, for large scale non-volatile storage within the computing system (e.g., hard disk drive). ICH 505 has bi-directional point-to-point links between itself and the observed I/O devices 508.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

We claim:

1. A method comprising:
receiving, from a first computing device at a second computing device, a first user persona having first user preferences of a first user of the first computing device, the first user preferences comprising a first plurality of subsets of data, the second computing device having a second user persona having second user preferences of the second user of the second computing device, the second user preferences comprising a second plurality of subsets of data;

dynamically integrating, at the second computing device, the first user persona with the second user persona, wherein integrating includes updating common subsets, wherein integrating comprises intersecting contents of the first and second personas between the first and second computing devices to facilitate easing of planning of events or selection of activities; and dynamically adjusting, at the second computing device, behavior of the first and second computing devices in response to one or more events, wherein the one or more events include a change in location of the first computing device or the second computing device.

2. The method of claim 1, wherein the behavior comprises static behavior or dynamic behavior, wherein the dynamic behavior of the second computing device is changed based on the first user preferences representing one or more interests of the first user as accepted by the second user over other first user preferences that are rejected by the second user.

3. The method of claim 2, wherein the dynamic behavior is further adjusted based on a current user mode of the second user of the second computing device, wherein the current user mode is determined based on current activities of the second user, wherein the current user mode comprises a work mode when the current activities are work-related, a family mode when the current activities are family-mode, or a play mode when the current activities are play-mode.

4. The method of claim 1, wherein the second user persona is received from the second computing device over a network via one or more of a device-to-device contact, an email, a social network, and a network repository.

5. The method of claim 1, further comprising back tracking the second user persona based on the received first user persona, wherein back tracking includes performing periodic backups of the second integrated user persona, wherein the periodic backups include event-based backups or time-based backups.

6. The method of claim 1, further comprising verifying the first user persona and the first computing device for security before accepting the first user persona at the second computing device.

7. The method of claim 1, wherein the first computing device comprises a local computing device, and wherein the second computing device comprises a remote computing device.

8. A system comprising a local computing device having a memory to store instructions and a processing device to execute the instructions, wherein the local computing device further includes a mechanism to perform one or more operations comprising:

receiving, from a remote computing device, a first user persona having first user preferences of a first user of the remote computing device including a first computing device, the first user preferences comprising a first plurality of subsets of data, the local computing device including a second computing device having a second user persona having second user preferences of the second user of the second computing device, the second user preferences comprising a second plurality of subsets of data;

dynamically integrating the first user persona with the second user persona, wherein integrating includes updating common subsets, wherein integrating comprises intersecting contents of the first and second personas between the first and second computing devices to facilitate easing of planning of events or selection of activities; and dynamically adjusting behavior of the first and second computing devices in response to one or more events, wherein the one or more events include a change in location of the first computing device or the second computing device.

9. The system of claim 8, wherein the behavior comprises static behavior or dynamic behavior, wherein the dynamic behavior of the second computing device is changed based on the first user preferences representing one or more interests of the first user as accepted by the second user over other first user preferences that are rejected by the second user.

10. The system of claim 9, wherein the dynamic behavior is further adjusted based on a current user mode of the second user of the second computing device, wherein the current user mode is determined based on current activities of the second user, wherein the current user mode comprises a work mode when the current activities are work-related, a family mode when the current activities are family-mode, or a play mode when the current activities are play-mode.

11. The system of claim 8, wherein the second user persona is received from the second computing device over a network via one or more of a device-to-device contact, an email, a social network, and a network repository.

12. The system of claim 8, wherein the one or more operations further comprise: back tracking the second user persona based on the received first user persona, wherein back tracking includes performing periodic backups of the second integrated user persona, wherein the periodic backups include event-based backups or time-based backups.

13. The system of claim 8, wherein the one or more operations further comprise: verifying the first user persona and the first computing device for security before accepting the first user persona at the second computing device.

14. A non-transitory machine-readable medium having stored thereon data comprising instructions which when executed by a machine, cause the machine to perform one or more operations comprising:

receiving, from a first computing device at a second computing, a first user persona having first user preferences of a first user of the first computing device, the first user preferences comprising a first plurality of subsets of data, the second computing device having a second user persona having second user preferences of the second user of the second computing device, the second user preferences comprising a second plurality of subsets of data;

dynamically integrating the first user persona with the second user persona, wherein integrating includes updating common subsets, wherein integrating comprises intersecting contents of the first and second personas between the first and second computing devices to facilitate easing of planning of events or selection of activities; and dynamically adjusting behavior of the first and second computing devices in response to one or more events, wherein the one or more events include a change in location of the first computing device or the second computing device.

15. The non-transitory machine-readable medium of claim 14, wherein the behavior comprises static behavior or dynamic behavior, wherein the dynamic behavior of the second computing device is changed based on the first user preferences representing one or more interests of the first user as accepted by the second user over other first user preferences that are rejected by the second user.

16. The non-transitory machine-readable medium of claim 15, wherein the dynamic behavior is further adjusted based on a current user mode of the second user of the second computing device, wherein the current user mode is determined based on current activities of the second user, wherein the current user mode comprises a work mode when the current activities are work-related, a family mode when the current activities are family-mode, or a play mode when the current activities are play-mode.

17. The non-transitory machine-readable medium of claim 14, wherein the second user persona is received from the second computing device over a network via one or more of a device-to-device contact, an email, a social network, and a network repository.

18. The non-transitory machine-readable medium of claim 14, wherein the one or more operations further comprise: back tracking the second user persona based on the received first user persona, wherein back tracking includes performing periodic backups of the second integrated user persona, wherein the periodic backups include event-based backups or time-based backups.

19. The non-transitory machine-readable medium of claim 14, wherein the one or more operations further comprise: verifying the first user persona and the first computing device for security before accepting the first user persona at the second computing device.

20. The non-transitory machine-readable medium of claim 14, wherein the first computing device comprises a local computing device, and wherein the second computing device comprises a remote computing device.

* * * * *